United States Patent
Hipwell, Jr. et al.

(10) Patent No.: US 7,088,559 B2
(45) Date of Patent: Aug. 8, 2006

(54) INTEGRATED INTERCONNECT AND METHOD OF MANUFACTURE THEREFOR

(75) Inventors: Roger L. Hipwell, Jr., Eden Prairie, MN (US); Wayne A. Bonin, North Oak, MN (US); Peter Crane, St. Paul, MN (US); Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 497 days.

(21) Appl. No.: 10/059,892

(22) Filed: Jan. 29, 2002

(65) Prior Publication Data

US 2003/0030942 A1    Feb. 13, 2003

Related U.S. Application Data

(60) Provisional application No. 60/311,724, filed on Aug. 10, 2001.

(51) Int. Cl.
    *G11B 5/56* (2006.01)

(52) U.S. Cl. .................................................. 360/294.3
(58) Field of Classification Search ... 360/294.1–294.7
    See application file for complete search history.

(56) References Cited

U.S. PATENT DOCUMENTS

| | | | | |
|---|---|---|---|---|
| 4,477,828 A | * | 10/1984 | Scherer | 257/687 |
| 5,243,756 A | * | 9/1993 | Hamburgen et al. | 29/841 |
| 5,923,955 A | * | 7/1999 | Wong | 438/108 |
| 5,959,808 A | * | 9/1999 | Fan et al. | 360/294.3 |
| 6,078,476 A | * | 6/2000 | Magee et al. | 360/294.3 |
| 6,156,652 A | | 12/2000 | Michalicek | 438/674 |
| 6,198,145 B1 | * | 3/2001 | Ferrari et al. | 257/415 |
| 6,249,064 B1 | | 6/2001 | Bradbury | 310/22 |
| 6,262,868 B1 | | 7/2001 | Arya et al. | 360/290 |
| 6,275,320 B1 | | 8/2001 | Dhuler et al. | 359/237 |
| 6,282,066 B1 | | 8/2001 | Bonin | 360/294.1 |
| 6,286,935 B1 | | 9/2001 | Silverbrook | 347/54 |
| 6,288,985 B1 | | 9/2001 | Jordache et al. | 369/44.23 |
| 6,297,936 B1 | | 10/2001 | Kant et al. | 360/294.4 |
| 6,351,354 B1 | * | 2/2002 | Bonin | 360/294.6 |
| 6,395,582 B1 | * | 5/2002 | Sohn et al. | 438/111 |
| 6,429,028 B1 | * | 8/2002 | Young et al. | 438/4 |
| 6,465,882 B1 | * | 10/2002 | Cohn et al. | 257/691 |
| 6,574,077 B1 | * | 6/2003 | Crane et al. | 360/294.3 |
| 6,611,399 B1 | * | 8/2003 | Mei et al. | 360/234.7 |
| 6,624,981 B1 | * | 9/2003 | Vigna | 360/294.3 |
| 6,665,151 B1 | * | 12/2003 | Bonin et al. | 360/294.3 |
| 6,833,978 B1 | * | 12/2004 | Shum et al. | 360/294.3 |
| 2003/0157426 A1 | * | 8/2003 | Jordan et al. | 430/200 |
| 2005/0084998 A1 | * | 4/2005 | Horning et al. | 438/48 |

FOREIGN PATENT DOCUMENTS

| | | | | |
|---|---|---|---|---|
| JP | | 361198656 A | * | 9/1986 |
| JP | | 363173332 A | * | 7/1988 |
| JP | | 403262122 A | * | 11/1991 |

* cited by examiner

*Primary Examiner*—Allen Cao
(74) *Attorney, Agent, or Firm*—Westman, Champlin & Kelly, P.A.

(57) ABSTRACT

An integrated interface structure for a nested body to provide an electrical connection. The interface structure includes nested bond pads which electrically interface with leads. The nested bond pads are fabricated on a microstructure to provide an interface to drive circuitry for transducer elements of a slider or head supported by the microstructure.

20 Claims, 9 Drawing Sheets

INTEGRATED INTERCONNECT AND METHOD OF MANUFACTURE THEREFOR

CROSS-REFERENCE TO RELATED APPLICATION

This application claims priority to U.S. Provisional Application Ser. No. 60/311,724 filed Aug. 10, 2001 and entitled "METHOD OF FABRICATING EMBEDDED SIDEWALL BOND PADS IN SILICON MICROSTRUCTURES."

FIELD OF THE INVENTION

The present invention relates to an integrated interconnect for a microstructure and in a particular embodiment, an integrated interconnect for transducer elements of a slider.

BACKGROUND OF THE INVENTION

A disc drive includes a head which reads or writes data from or to a data storage device or disc. Heads include transducer elements, such as inductive, magneto-resistive or magneto-optical transducers which are coupled to a slider and electrically interface with drive circuitry for read/write operations. Typically, heads are electrically interfaced with drive circuitry through wire leads or through leads printed on a flexible circuit. These known interface techniques require complex interconnect steps to complete the electrical connection and can interfere with operation of the data head. The present invention addresses these and other problems and offers solutions not previously recognized nor appreciated.

SUMMARY OF THE INVENTION

The present invention relates to an integrated interconnect. As in the embodiments described, the integrated interconnect includes bond pads fabricated on an inner wall of a microstructure cavity and provides an integrated interconnect for electrical elements to operation circuitry without lead wires or a printed flexible circuit. The present invention is characterized by these and other features as illustrated in the described embodiments.

BRIEF DESCRIPTION OF THE DRAWINGS

FIGS. 2-1 to 2-10 illustrate fabrication embodiments for an integrated interconnect.

FIG. 3 is a schematic illustration of a disc drive and head assembly for reading data from or writing data to a disc of a disc drive.

FIG. 4 illustrates bond pads for an integrated interconnect for a slider supported by a microactuator structure.

FIG. 5 is an exploded view or illustration of the bond pads of FIG. 4.

FIG. 6 is a flow chart illustrating an embodiment of fabrication process steps for bond pads for an integrated interconnect.

DETAILED DESCRIPTION OF ILLUSTRATIVE EMBODIMENTS

Figure 1:
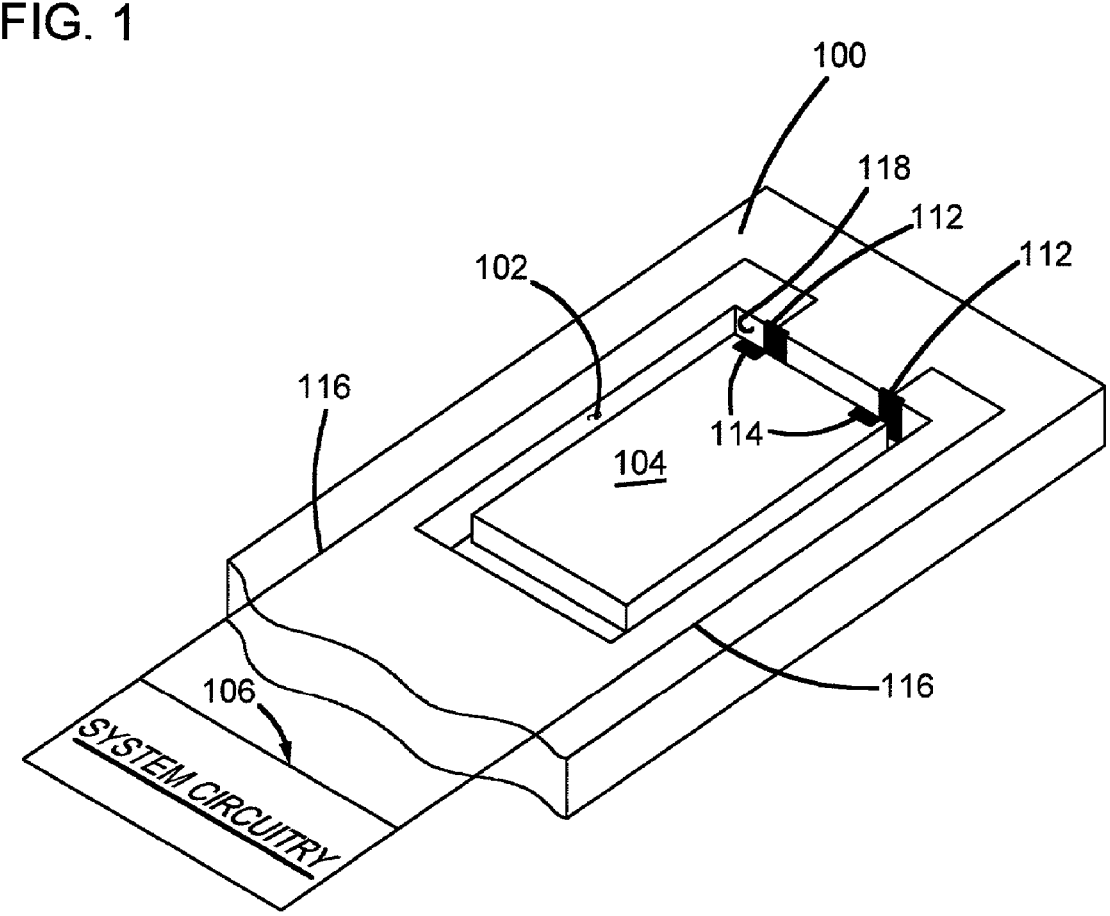
FIG. 1 is an illustrated embodiment of an integrated interconnect of the present invention.

FIG. 1 schematically illustrates nested bodies or microstructures including a first body 100 including a cavity 102 and a second nested body 104 disposed in the cavity 102. The present invention generally relates to an integrated interconnect for nested body 104 through the first body 100 as described herein which provides advantages over prior non-integrated interconnect systems.

As illustrated in the embodiment of FIG. 1, the nested body 104 interfaces with system circuitry 106 through integrated bond pads 112, 114 on the first body 100 and the nested body 104. As shown bond pads 112 are conductively coupled to leads 116 fabricated on the first body 100 which can be electrically interfaced with system circuitry 106. Bond pads 114 are formed on a surface of the nested body 104 by known fabrication techniques. Bond pads 112 are formed on a side wall 118 of the nest cavity 102 of the first body 100 as will be described to interface with bond pads 114 on the nested body 104. Thus, as described bond pads 112, 114 cooperatively form an integrated interconnect for nested bodies or microstructures which has application and use as described herein.

FIGS. 2-1 through 2-4 progressively illustrate a simplified embodiment of a fabrication process for fabricating nested bond pads for a nested microstructure according to the present invention which has particular application for a silicon microstructure as will be described. As shown, the first body 100-1 is fabricated from a substrate 120, such as a silicon microstructure. The electrical interface on the first body 100-1 is fabricated by depositing conductive leads and embedded bond pads on the substrate 120.

Figures 1, 2:
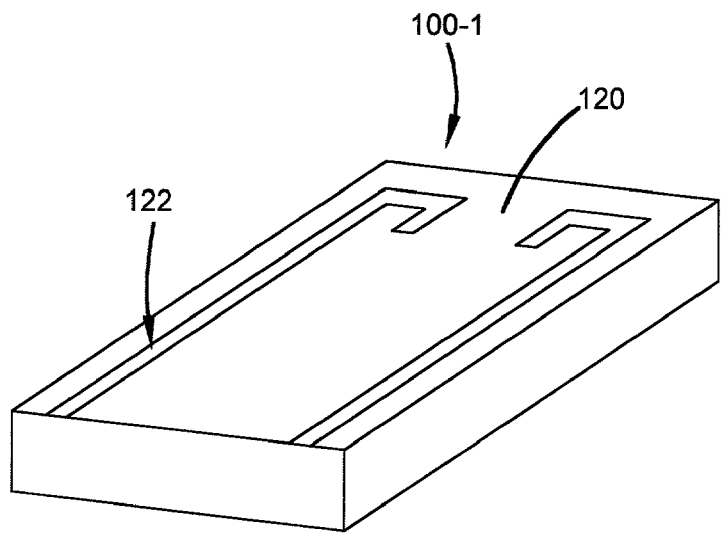
Figure 2:
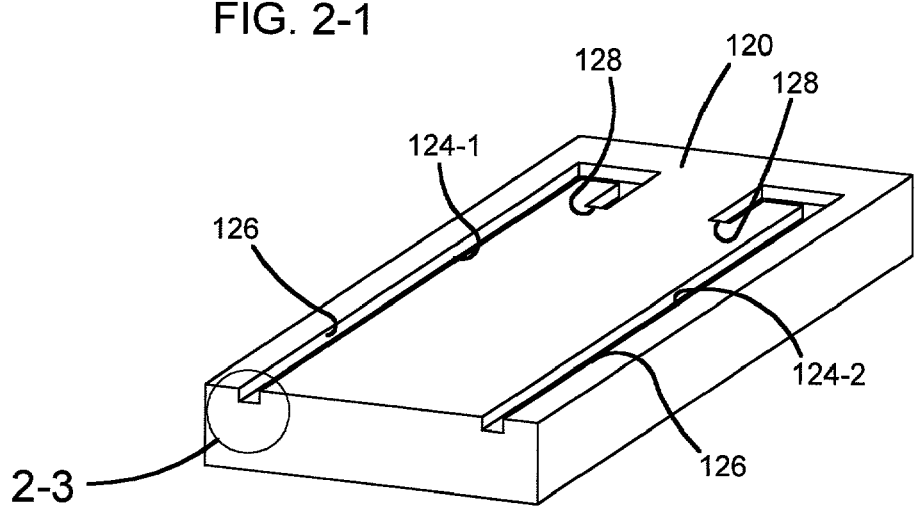
Figures 2, 3:
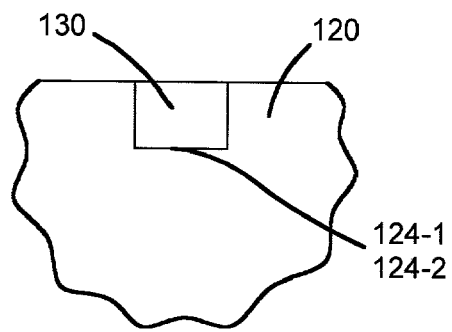
Figures 2, 3, 4:
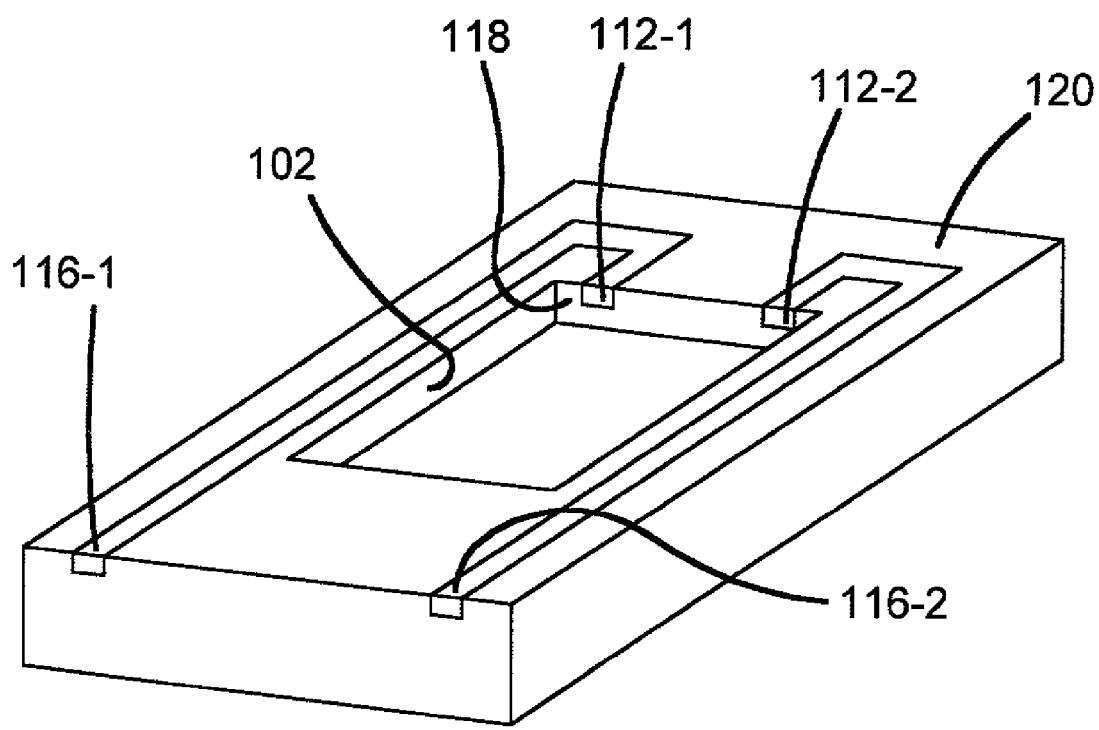
Figures 2, 3, 4, 5:
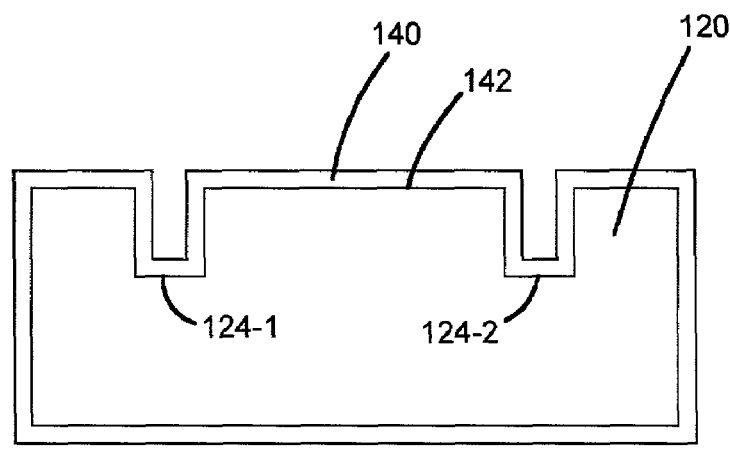
Figures 2, 3, 4, 5, 6:
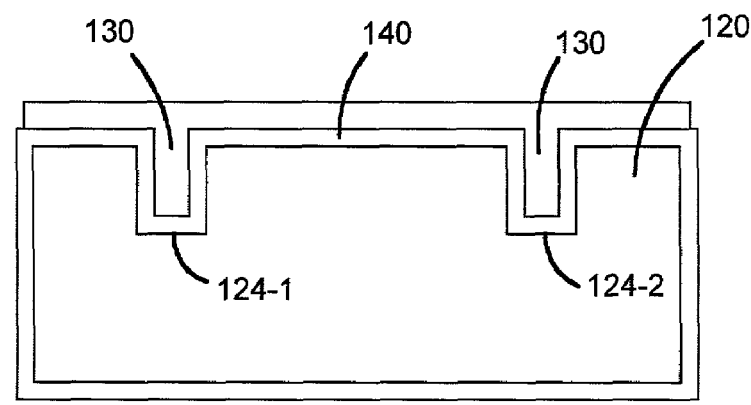
Figures 2, 3, 4, 5, 6, 7:
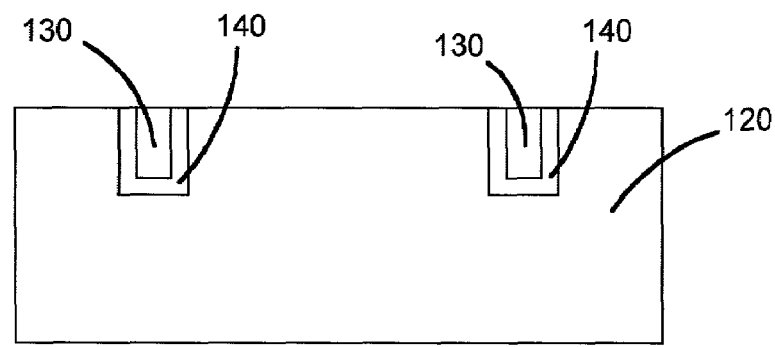
Figures 2, 3, 4, 5, 6, 7, 8:
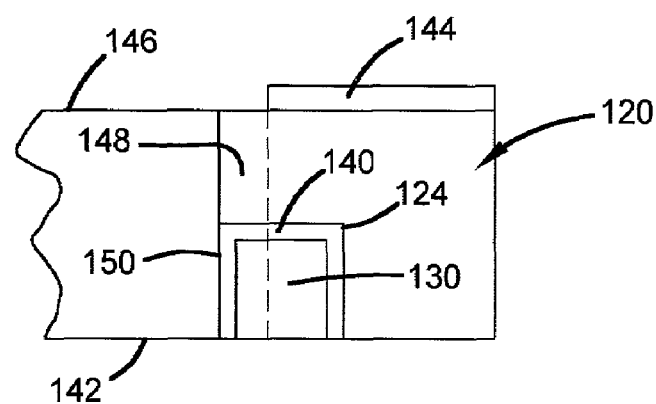
Figures 2, 3, 4, 5, 6, 7, 8, 9:
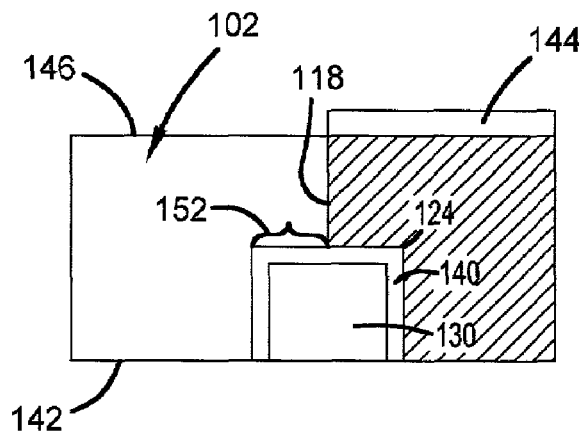
Figures 2, 3, 4, 5, 6, 7, 8, 9, 10:
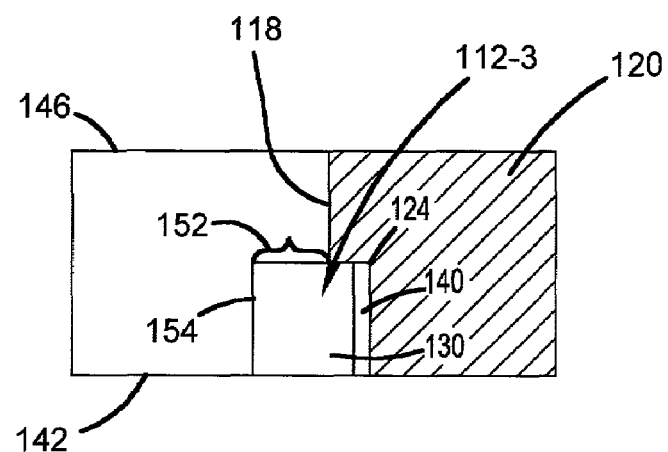
Figure 3:
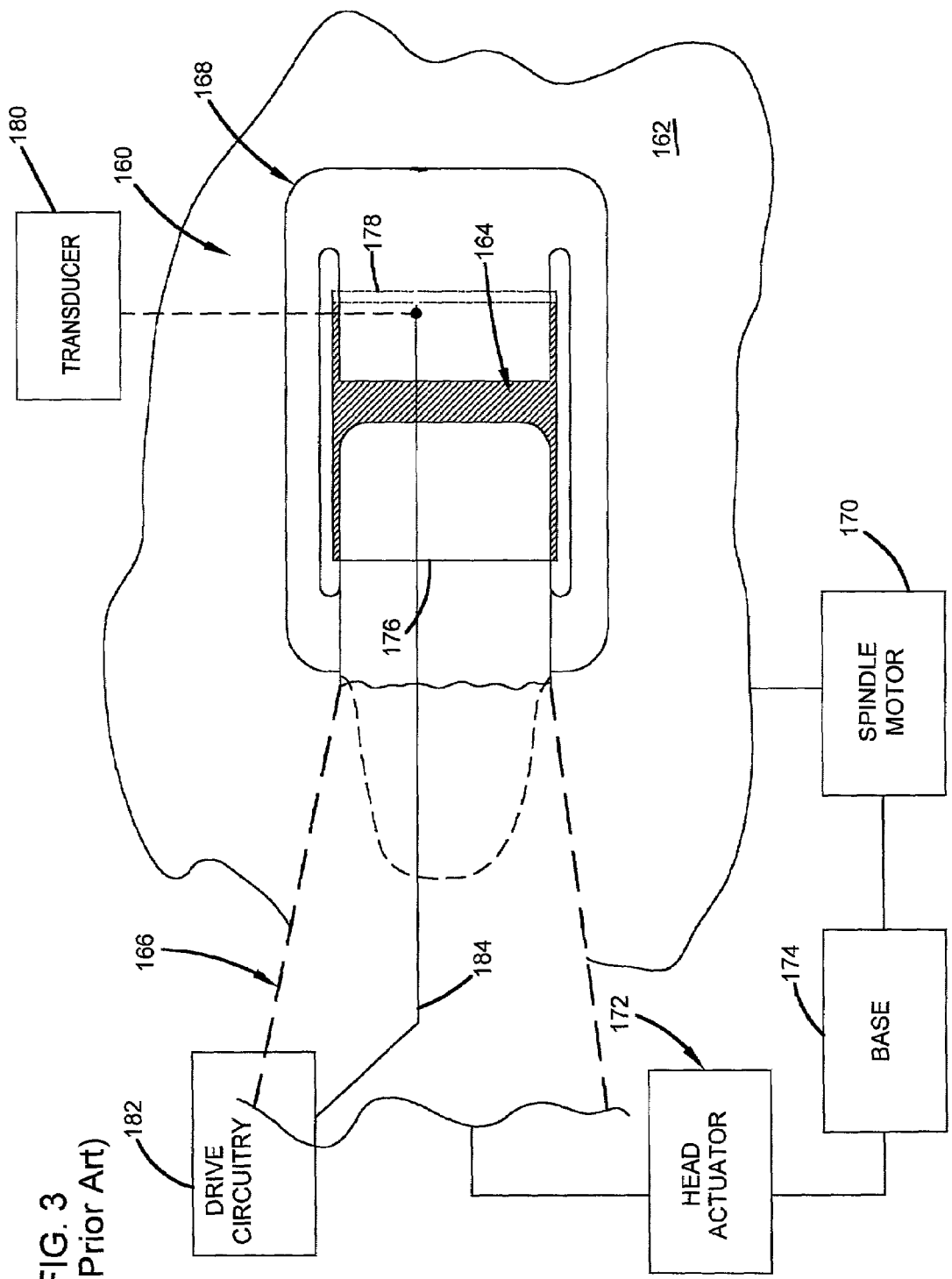
Figure 4:
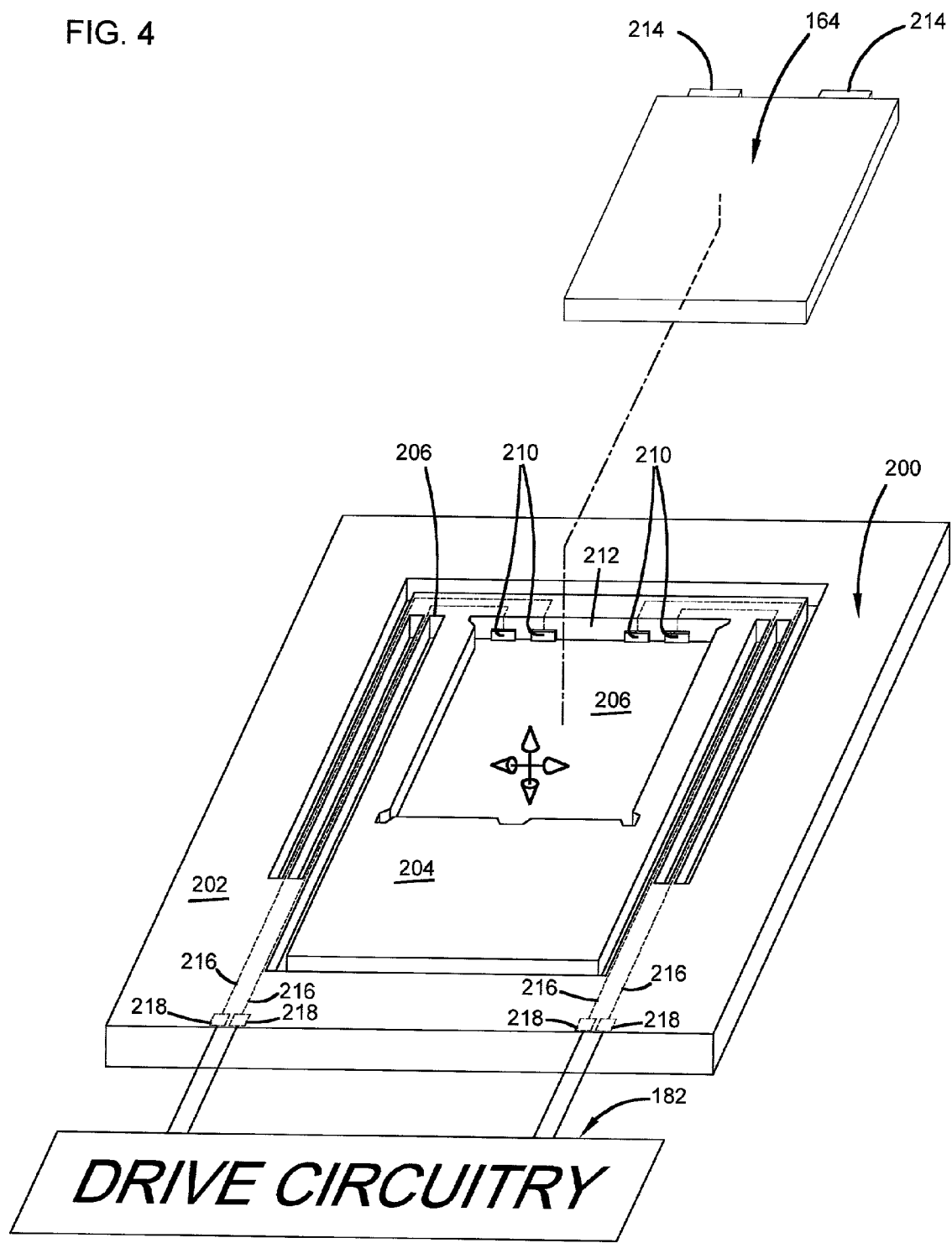
Figure 5:
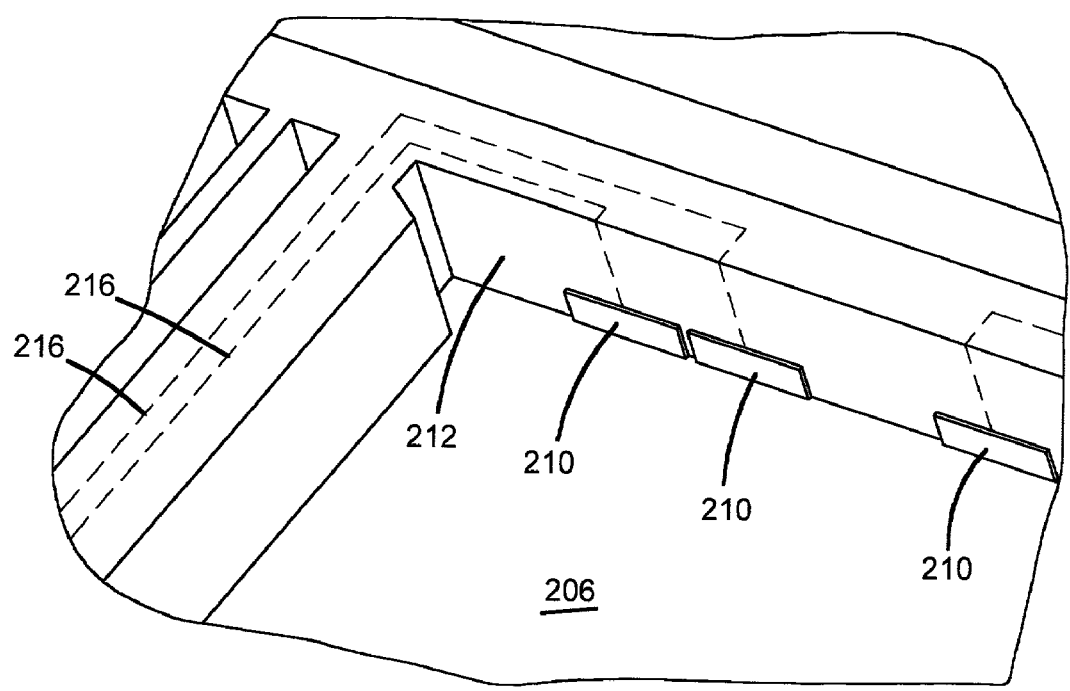
Figure 6:
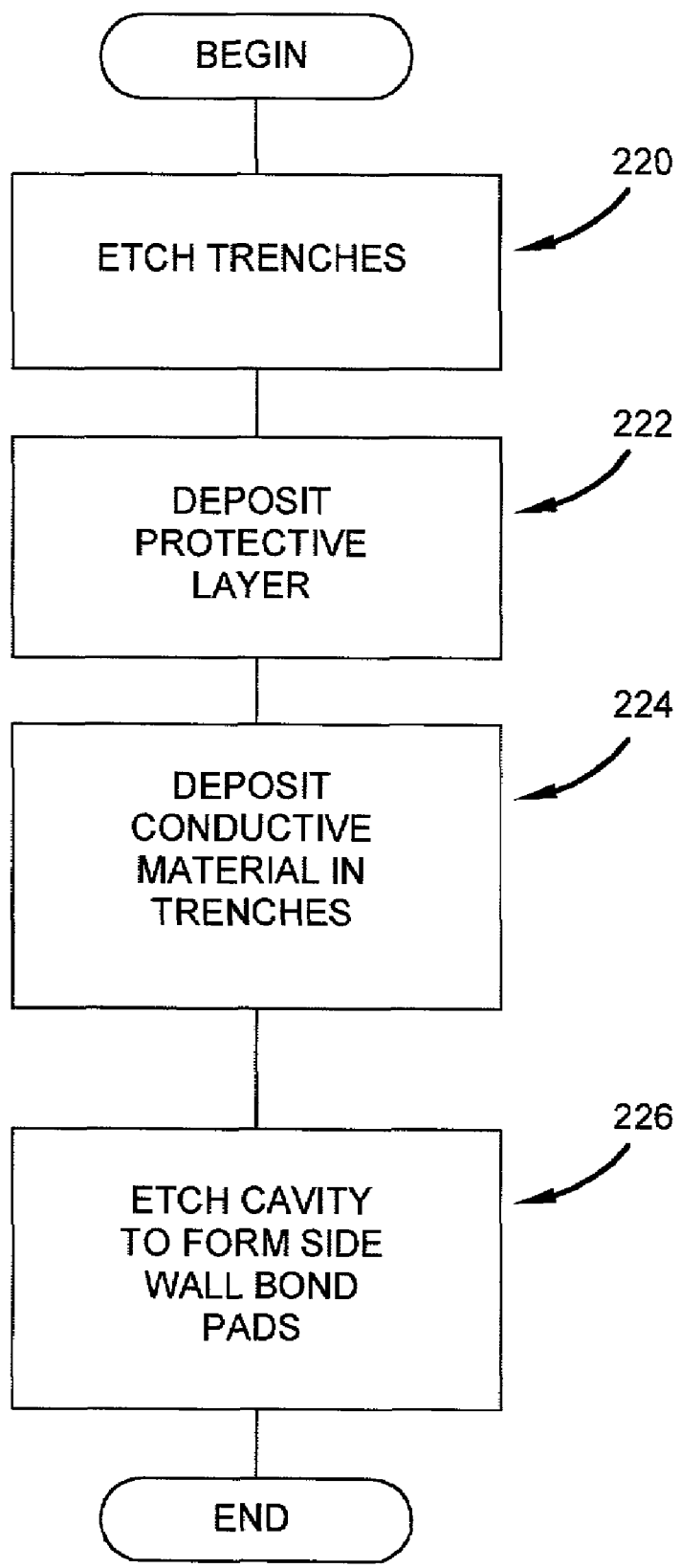

In the particular embodiment illustrated, the conductive leads and embedded bond pads are formed by a patterned mask 122 deposited on the substrate 120 as illustrated in FIG. 2-1. The masked surface of the substrate 120 is etched to form trenches 124-1, 124-2 having an elongated portion 126 and an embedded end surface 128 as shown in FIG. 2-2. As shown in FIG. 2-3, a conductive layer 130 is deposited into the etched trenches 124-1, 124-2 to form the leads 116 and embedded bond pads proximate to embedded surface 128. Thereafter, the nest cavity 102 is etched, as illustrated in FIG. 2-4 proximate to the embedded bond pads or embedded surface 128 to form the inner wall 118 of the cavity 102 having bond pads 112-1, 112-2 which are conductively coupled to leads 116-1, 116-2 for electrical interface with bond pads 114 on a nested body 104 or microstructure as previously described.

FIGS. 2-5 through 2-10 illustrate a more detailed embodiment to form raised bond pads on the wall 118 of the cavity 102. In the process embodiment shown, a protective layer 140 is deposited in the trenches 124-1, 124-2 formed on a first substrate surface 142 as illustrated in FIG. 2-5. The protective layer 140 is deposited prior to depositing the conductive layer 130 in the trenches 124-1, 124-2 as previously described. The deposited protective layer 140 will protect the conductive layer 130 during the etching process as will be described. In the particular illustrated embodiment, the protective layer 140 is deposited on the entire substrate by chemical vapor deposition techniques or processes and is preferably a silicon dioxide deposited on a silicon substrate 120. Thereafter as shown in FIG. 2-6, the conductive layer 130 is deposited into the trenches 124-1, 124-2 lined with the protective layer 140. The deposited conductive layer 130 can be copper, gold, aluminum or other conductive material.

As illustrated comparatively in FIGS. 2-6 and 2-7, once the trenches 124-1, 124-2 are filled with the conductive layer 130 or material, the excess deposited protective layer 140 and conductive layer 130 are removed from the substrate surface as shown, for example by a chemical mechanical planarization process using a wet or dry etch. The nest cavity 102 is then etched from substrate 120 as previously described. In the particular embodiment illustrated in FIGS. 2-8 to 2-10, a mask layer 144 is deposited on a surface 146 opposed to surface 142 having the trenches 124-1, 124-2 formed thereon to form cavity 102. The mask layer 144 is spaced from an embedded end surface 150 of the conductive trench 124 to etch portion 148 (illustrated by dotted lines) between the embedded end surface 150 of the conductive trench 124 and the mask layer 144 recessed from the embedded end surface 150 of the conductive trench 124.

The masked substrate is etched for example by a deep reactive ion etching process. The substrate is etched including portion 148 to form the cavity 102 while the protective layer 140 protects portion 152 of the trench below etched portion 148 as illustrated in FIG. 2-9. The protective layer 140 is removed from portion 152 to form raised bond pad 112-3 having a raised surface 154 spaced from wall 118 of the nest cavity 102 as shown in FIG. 2-10. In one embodiment, the protective layer 140 is removed from conductive portion of the conductive trench by a plasma stripping or etching process. Although a protective mask layer 144 is shown, application is not limited to the protective mask layer 144 and other positive or negative masking process can be employed The illustrated interconnect has application for connecting transducer elements of a slider to drive circuitry. In particular, as shown in FIG. 3, disc drives include heads 160 to read data from or write data to a disc surface 162. As shown, head 160 includes a slider 164 which is supported by a suspension arm 166 through a gimbal spring 168. The gimbal spring 168 flexibly supports the slider 164 to pitch and roll relative to the disc surface. As shown, a spindle motor 170 rotates the disc 162 and a head actuator 172 positions the head relative to selected data tracks on the disc surface for read/write operation. As illustrated schematically, head and disc components are coupled to a base chassis 174 to form the structure of the disc drive The slider includes a leading edge 176 and a trailing edge 178. The slider supports transducer elements 180 illustrated schematically at the trailing edge 178. Transducer elements include for example, inductive, magnetoresistive or magneto-optical transducers. For operation, transducer element 180 is electrically coupled to drive circuitry 182 as illustrated by line 184 for read-write operations. The illustrated interconnect embodiment of FIG. 1 provides an integrated interconnect for transducer elements on a slider to drive circuitry.

In particular, with reference to FIG. 1, the slider forms body 104 which is supported a slider cavity of a microstructure such as body 100. Transducer elements on the slider are electrically connected to drive circuitry 182 through integrated bond pads formed on a wall of the slider cavity formed on the microstructure or body 100. The integrated interconnect described provides advantages over prior interconnects and in one example, provides a simple interconnect for electrically interfacing a series of sliders to test circuitry for testing operations.

Areal disc drive density is increasing demanding increased precision in head placement and thus, advanced suspension assemblies include microactuator controlled head placement proximate to the slider or head. FIG. 4 illustrates a head microactuator embodied in a MEMS to provide precision head placement proximate to the head or slider where like numbers are used to identify like parts in the previous FIGS. As shown the MEMS includes microactuator body or microstructure 200 having a base portion 202 and a floating portion 204. Floating portion 204 is coupled to and supported relative to base portion 202 to move in various directions as illustrated by the direction arrows shown. As shown, the floating portion 204 includes a slider cavity 206 which supports the slider 164 to move with the floating portion 204 relative to the base portion 202 to provide micro actuated head placement. The floating portion 204 moves relative to the base portion 202 by an integrated MEMS structure (not shown).

As previously described, transducer elements 180 of the head are electrically connected to drive circuitry 182 for read/write operation. Attachment of lead wires or circuitry to a slider 164 supported by a microactuator body can affect position control or dynamics of the microactuator. The present invention provides an integrated interconnect through the MEMS structure or body 200. The microactuator body 200 shown incorporates nested bond pads 210 formed on wall 212 of the slider cavity 206. The bond pads 210 interface with bond pads 214 on the slider 164. Bond pads 210 are conductively coupled to leads 216 on the microactuator body 200 which interface with drive circuitry 182 through an electrical connection to terminals 218 conductively coupled to leads 216. As illustrated in more detail, in FIG. 5, bond pads 210 are raised from wall 212 to provide the desired integrated electrical interface.

As previously described, bond pads 210 and leads 216 are printed on the microstructure or microactuator body 100, 200. In particular in one embodiment, as shown in the illustrated flow chart of FIG. 6, bond pads 210 are fabricated by forming trenches on a first surface of the substrate or microactuator body 100, 200 as illustrated by block 220. As shown by block 222, trenches are lined with a protective layer 140 and a conductive layer or material is deposited in the lined trenches as illustrated by block 224. Thereafter the cavity is etched from a second surface of the substrate or microstructure 100, 200 to form the raised bond pads 210 as illustrated by block 226. Leads are formed along elongated portions of the trenches and preferable lead terminals 218 are deposited or fabricated on the microstructure or body 100, 200 to provide electrical connection to the fabricated bond pads 210 to electrically interface transducer elements to drive circuitry as previously described.

An integrated interconnect for a microstructure (such as 104, 164) to provide an electrical connection. The integrated interconnect includes nested bond pads (such as 112, 210) which electrically interface with leads (such as 116, 216). The nested bond pads (such as 112, 210) provide an electrical interface to bond pads (such as 114, 214) electrically connected to transducer elements of a slider or body. The nested bond pads (such as 112, 210) are formed on a wall of a microstructure or microactuator body (such as 100, 200) to provide an integrated interconnect to circuitry (such as 106, 182).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a head assembly it will be appreciated by those skilled in the art that the teachings of the present invention can be applied to other systems, nested bodies or microstructures without departing from the scope and spirit of the present invention.

What is claimed is:

1. An interconnect assembly for a microstructure comprising:
    a base having first and second opposing surfaces, a cavity extending into said base from said first opposing surface, and a trench extending into said base from said first opposing surface, wherein said trench includes a distal end adjacent to said cavity; and
    a bond pad formed on a side wall of said cavity adjacent said trench.

2. The interconnect assembly of claim 1 wherein the base includes a lead formed in said trench and conductively coupled to the bond pad on the side wall of said cavity.

3. The interconnect assembly of claim 1 wherein the trench is etched in the base and the bond pad is formed in said etched trench.

4. The interconnect assembly of claim 1 wherein the bond pad includes a raised surface spaced from the side wall of said cavity.

5. The interconnect assembly of claim 1 wherein said cavity is etched and said bond pad is formed on the etched cavity wall.

6. The interconnect assembly of claim 1 wherein the base includes a base portion and a floating portion movable relative to said base portion and said cavity is formed in the floating portion.

7. The interconnect assembly of claim 1 and further comprising the microstructure disposed in said cavity and the microstructure including at least one bond pad to interface with the bond pad formed on the side wall of said cavity.

8. The interconnect assembly of claim 1 wherein the side wall has a generally vertical orientation when the first and second opposing surfaces are orientated generally horizontally.

9. An electrical interconnect of a microstructure comprising:
    a frame having a cavity and a trench etched in said frame;
    an electrical lead deposited in said trench; and
    a bond pad embedded in a side wall of said cavity of said frame, said bond pad being electrically coupled to said electrical lead.

10. The electrical interconnect of claim 9 comprising a plurality of bond pads embedded in said side wall of said cavity.

11. The electrical interconnect of claim 9 and further comprising a microstructure body disposed in said cavity having a bond pad to interface with the bond pad on said side wall of said cavity.

12. The electrical interconnect of claim 11 wherein the microstructure body is a slider including at least one transducer element.

13. The electrical interconnect of claim 9 wherein the frame includes a base portion and a floating portion and said cavity is formed in the floating portion.

14. The electrical interconnect of claim 9 wherein the embedded bond pad is formed in a trench opened to said cavity.

15. An integrated interconnect assembly for a microstructure comprising:
    a microstructure body including a microstructure cavity having a bond pad formed on an inner side wall of the microstructure cavity and conductively coupled to a lead embedded below an external surface of the microstructure body.

16. The integrated interconnect of claim 15 wherein the bond pad is formed on an etched cavity wall.

17. The integrated interconnect of claim 15 wherein the lead is formed in an etched trench on the microstructure body.

18. The integrated interconnect of claim 15 and comprising a slider disposed in said microstructure cavity having at least one bond pad.

19. The integrated interconnect of claim 15 wherein the microstructure body includes a floating portion and said microstructure cavity is formed in the floating portion.

20. The integrated interconnect of claim 15 wherein the bond pad is embedded below an etched surface of the inner side wall.

* * * * *